United States Patent
Kokado et al.

(10) Patent No.: US 10,090,514 B2
(45) Date of Patent: Oct. 2, 2018

(54) POSITIVE-ELECTRODE MATERIAL FOR NONAQUEOUS-ELECTROLYTE SECONDARY BATTERY, METHOD FOR MANUFACTURING THE SAME, AND NONAQUEOUS-ELECTROLYTE SECONDARY BATTERY USING SAID POSITIVE-ELECTRODE MATERIAL

(71) Applicant: SUMITOMO METAL MINING CO., LTD., Minato-ku, Tokyo (JP)

(72) Inventors: Rei Kokado, Niihama (JP); Kensaku Mori, Niihama (JP); Masanori Takagi, Niihama (JP); Tetsutaro Hayashi, Niihama (JP)

(73) Assignee: Sumitomo Metal Mining Co., Ltd. (JP)

( * ) Notice: Subject to any disclaimer, the term of this patent is extended or adjusted under 35 U.S.C. 154(b) by 98 days.

(21) Appl. No.: 15/381,171

(22) Filed: Dec. 16, 2016

(65) Prior Publication Data

US 2017/0098821 A1  Apr. 6, 2017

Related U.S. Application Data

(62) Division of application No. 14/379,924, filed as application No. PCT/JP2013/053472 on Feb. 14, 2013.

(30) Foreign Application Priority Data

Feb. 22, 2012 (JP) ................................. 2012-036344

(51) Int. Cl.
*H01M 4/62* (2006.01)
*H01M 4/525* (2010.01)
(Continued)

(52) U.S. Cl.
CPC ........... *H01M 4/1391* (2013.01); *B29B 7/005* (2013.01); *B29C 43/003* (2013.01); *B29C 43/02* (2013.01);
(Continued)

(58) Field of Classification Search
CPC ............... H01M 4/1391; H01M 4/622; H01M 10/0525; H01M 4/485; H01M 4/043;
(Continued)

(56) References Cited

U.S. PATENT DOCUMENTS

2010/0209771 A1   8/2010  Shizuka et al.
2011/0003200 A1   1/2011  Shizuka et al.
(Continued)

FOREIGN PATENT DOCUMENTS

EP        2110872       10/2009
JP        2002-75367    3/2002
(Continued)

OTHER PUBLICATIONS

Effect of carbon additive on electrochemical performance of LiCoO2 composite cathodes by Jin K. Hong, Jong H. Lee, Seung M, Oh. Accepted May 2, 2002.
(Continued)

*Primary Examiner* — Peter F Godenschwager
*Assistant Examiner* — Andrew J Oyer
(74) *Attorney, Agent, or Firm* — Gerald E. Hespos; Michael J. Porco; Matthew T. Hespos (57) ABSTRACT

Provided is a positive-electrode material for nonaqueous-electrolyte secondary batteries, the positive-electrode material being capable of achieving both high capacity and high output when used for a positive electrode for nonaqueous-electrolyte secondary batteries. Also, provided is a method for manufacturing the positive-electrode material for non-aqueous-electrolyte secondary batteries, wherein a lithium
(Continued)

metal composite oxide powder is mixed with lithium tungstate, the lithium metal composite oxide powder being represented by a general formula $Li_zNi_{1-x-y}Co_xM_yO_2$ (wherein $0.10 \leq x \leq 0.35$, $0 \leq y \leq 0.35$, $0.97 \leq z \leq 1.20$, and M is an addition element and at least one element selected from Mn, V, Mg, Mo, Nb, Ti, and Al) and comprising primary particles and secondary particles composed of aggregation of the primary particles.

12 Claims, 2 Drawing Sheets

(51) Int. Cl.

| | | |
|---|---|---|
| H01M 4/485 | (2010.01) | |
| H01M 4/36 | (2006.01) | |
| H01M 4/04 | (2006.01) | |
| C01G 53/00 | (2006.01) | |
| H01M 4/1391 | (2010.01) | |
| H01M 4/131 | (2010.01) | |
| H01M 4/02 | (2006.01) | |
| B29B 7/00 | (2006.01) | |
| B29C 43/00 | (2006.01) | |
| B29C 43/02 | (2006.01) | |
| H01M 10/0525 | (2010.01) | |
| H01M 10/052 | (2010.01) | |
| B29K 105/16 | (2006.01) | |
| B29K 509/00 | (2006.01) | |
| B29L 31/34 | (2006.01) | |

(52) U.S. Cl.
CPC ............ *C01G 53/42* (2013.01); *C01G 53/50* (2013.01); *H01M 4/043* (2013.01); *H01M 4/131* (2013.01); *H01M 4/364* (2013.01); *H01M 4/485* (2013.01); *H01M 4/525* (2013.01); *H01M 4/622* (2013.01); *H01M 4/624* (2013.01); *H01M 10/0525* (2013.01); *B29K 2105/16* (2013.01); *B29K 2509/00* (2013.01); *B29K 2995/0005* (2013.01); *B29L 2031/3468* (2013.01); *C01P 2004/61* (2013.01); *C01P 2004/62* (2013.01); *C01P 2006/12* (2013.01); *C01P 2006/40* (2013.01); *H01M 10/052* (2013.01); *H01M 2004/028* (2013.01); *H01M 2220/20* (2013.01)

(58) Field of Classification Search
CPC ...... H01M 4/624; H01M 4/364; H01M 4/131; H01M 2004/028; H01M 2220/20; H01M 4/525; H01M 10/052; B29B 7/005; B29C 43/003; B29C 43/02; C01G 53/42; C01G 53/50; C01P 2006/40; C01P 2004/62; C01P 2004/61; C01P 2006/12; B29K 2509/00; B29K 2995/0005; B29K 2105/16; B29L 2031/3468

See application file for complete search history.

(56) References Cited

U.S. PATENT DOCUMENTS

| | | |
|---|---|---|
| 2011/0151327 A1 | 6/2011 | Imanari |
| 2014/0011090 A1 | 1/2014 | Toya et al. |

FOREIGN PATENT DOCUMENTS

| | | |
|---|---|---|
| JP | 2002-075367 | 3/2002 |
| JP | 2005-251716 | 9/2005 |
| JP | 2005-320184 | 11/2005 |
| JP | 2008-285388 | 11/2008 |
| JP | 2009-289726 | 12/2009 |
| JP | 2010-040383 | 2/2010 |
| JP | 2011-216214 | 10/2011 |
| JP | 4915488 | 2/2012 |
| JP | 2012-079464 | 4/2012 |
| JP | 2012-099271 | 5/2012 |
| KR | 1020110073488 | 6/2011 |

OTHER PUBLICATIONS

European Office Action dated Oct. 28, 2016.
International Search Report dated May 28, 2013.
Korean Patent Appl. No. 10-2014-7012633—Office Action dated Aug. 27, 2015.
European Patent Appl. No. 13751366.9—extended Search Report dated Jul. 6, 2015.

POSITIVE-ELECTRODE MATERIAL FOR NONAQUEOUS-ELECTROLYTE SECONDARY BATTERY, METHOD FOR MANUFACTURING THE SAME, AND NONAQUEOUS-ELECTROLYTE SECONDARY BATTERY USING SAID POSITIVE-ELECTRODE MATERIAL

The present application is a divisional application of U.S. patent application Ser. No. 14/379,924, filed Aug. 20, 2014, the contents of which are hereby incorporated by reference in their entirety.

BACKGROUND

1. Field of the Invention

The present invention relates to a positive-electrode material for nonaqueous-electrolyte secondary batteries, a manufacturing method therefor, and a nonaqueous-electrolyte secondary battery using said positive-electrode material.

2. Description of the Related Art

In recent years, with the spread of portable electronic equipment, such as cell phones and notebook-sized personal computers, development of a small and lightweight non-aqueous-electrolyte secondary battery having a high energy density has been strongly desired. Also, development of a high-output secondary battery as a battery for electric vehicles, such as hybrid vehicles, has been strongly desired.

As a secondary battery satisfying such demands, there can be mentioned a lithium-ion secondary battery.

This lithium-ion secondary battery uses a material capable of desorption and insertion of lithium as an active material for a negative electrode and a positive electrode.

At present, research and development of such lithium-ion secondary battery are being actively conducted, and particularly, since a 4V class high voltage can be achieved by a lithium-ion secondary battery using lithium metal composite oxide having a layered or spinel structure as a positive-electrode material, the commercialization thereof as a battery having a high energy density is progressing.

Examples of active materials which have been proposed until now include lithium-cobalt composite oxide ($LiCoO_2$), which is relatively easily synthesized; lithium-nickel composite oxide ($LiNiO_2$), in which nickel, more inexpensive than cobalt, is contained; lithium-nickel-cobalt-manganese composite oxide ($LiNi_{1/3}Co_{1/3}Mn_{1/3}O_2$); and lithium-manganese composite oxide ($LiMn_2O_4$), in which manganese is contained.

Among these, lithium-nickel composite oxide and lithium-nickel-cobalt-manganese composite oxide have been highlighted as a material demonstrating excellent battery characteristics, such as having excellent cycle characteristics and providing high output with low resistance, and furthermore, in recent years, lower resistance, which is necessary for achieving higher output, has been regarded as important.

As a method for improving such battery characteristics, addition of different elements is applied, and particularly, it is supposed that a high-valent transition metal, such as W, Mo, Nb, Ta, or Re, is useful.

For example, Japanese Patent Application Laid-Open No. 2009-289726 proposes a lithium transition metal compound powder for use as a positive-electrode material for lithium secondary batteries, the lithium transition metal compound powder containing 0.1 to 5 mol % of at least one element selected from Mo, W, Nb, Ta, and Re, with respect to a total molar amount of Mn, Ni, and Co, and describes that an atomic ratio of a total of Mo, W, Nb, Ta, and Re to a total of metallic elements other than Li and Mo, W, Nb, Ta, Re, on the surface of primary particles, is preferably five or more times than the atomic ratio of the whole of the primary particles.

According to this proposal, there can be provided low cost, high safety and high load characteristics, as well as improvement in powder handling, in the lithium transition metal compound powder for use as a positive-electrode material for lithium secondary batteries.

The above-mentioned lithium transition metal compound powder is obtained in such a manner that a raw material is pulverized in a liquid medium, and then a slurry in which the raw material is uniformly dispersed is sprayed and dried, and baked. Therefore, there is a problem that a part of the different elements, such as Mo, W, Nb, Ta, and Re, substitutes for Ni which has been arranged in layers, whereby battery characteristics, such as battery capacity and cycle characteristics, decrease.

Japanese Patent Application Laid-Open No. 2005-251716 proposes a positive-electrode active material for nonaqueous-electrolyte secondary batteries, the positive-electrode active material comprising at least lithium transition metal composite oxide having a layered structure, wherein the lithium transition metal composite oxide exists in a form of particles comprising either or both of primary particles and secondary particles composed of aggregation of the primary particles, and has, at least on the surface of said particles, a compound comprising at least one selected from the group consisting of molybdenum, vanadium, tungsten, boron, and fluorine, and Patent Literature 2 describes that the positive-electrode active material for nonaqueous-electrolyte secondary batteries achieves excellent battery characteristics even under severer environment conditions for use.

Japanese Patent Application Laid-Open No. 2005-251716 particularly discloses that, since the positive-electrode active material has, on the surface of the particles, a compound comprising at least one selected from the group consisting of molybdenum, vanadium, tungsten, boron, and fluorine, electrical conductivity is improved, whereby the initial characteristics are improved without loss of improvement in thermal stability, load characteristics, and output characteristics.

However, Japanese Patent Application Laid-Open No. 2005-251716 discloses that the effect of the selected addition element exists in improvement in initial characteristics, that is, initial discharge capacity and initial efficiency, and the effect on output characteristics is dependent on the aspect ratio of primary particles.

According to the disclosed manufacturing method, there is a problem that, the addition element is mixed and baked with a hydroxide which has been heat-treated simultaneously with a lithium compound, and therefore a part of the addition element substitutes for nickel which has been arranged in layers, whereby battery characteristics decrease.

Furthermore, there has been proposed an improvement achieved by forming a compound layer made of lithium and a different element on the surfaces of positive-electrode active material particles. For example, Japanese Patent Application Laid-Open No. 2002-75367 proposes a positive-electrode active material for lithium secondary batteries, the positive-electrode active material having a surface layer containing Li and at least one selected from the group consisting of Mo and W on the surface of lithium composite oxide capable of inclusion and desorption of Li ions.

This proposal aims at providing a positive-electrode active material having good thermal stability without greatly degrading high initial discharge capacity in order to achieve a lithium-ion secondary battery having higher capacity and higher energy density and having a large size, but Japanese Patent Application Laid-Open No. 2002-75367 does not mention any improvement in output characteristics.

On the other hand, there has been proposed an attempt to blend a material having an improving effect on battery characteristics into component materials of a battery without improvement of an active material itself.

For example, Japanese Patent Application Laid-Open No. 2008-285388 proposes a lithium-ion conductivity improving material comprising a metal oxide carrier and a lithium ion conductive group or a lithium ion conductive metal oxide, the lithium ion conductive group and the lithium ion conductive metal oxide each being supported on the metal oxide carrier and having higher acidity than the metal oxide carrier has.

According to this proposal, the use of the conductivity improving material allows lithium ion conductivity to be effectively improved, thereby reducing lithium ion resistance of a battery.

However, as Japanese Patent Application Laid-Open No. 2008-285388 describes that, by addition of the lithium-ion conductivity improving material to any one of a positive-electrode layer, a negative electrode layer and a separator, lithium ion conductivity is improved, this proposal aims at improvement in conductivity of lithium ions between battery component materials, and the proposal does not aim at reduction in resistance in charge and discharge of a positive-electrode active material itself. Furthermore, it cannot be said that the improving effect on lithium ion resistance disclosed in Examples is satisfactory.

In view of such problems, the present invention aims to provide a positive-electrode material mixture for nonaqueous-electrolyte secondary batteries, the positive-electrode material mixture achieving high output as well as high capacity when used for a positive-electrode.

SUMMARY OF THE INVENTION

In order to solve the above-mentioned problems, the inventors earnestly studied powder characteristics of lithium metal composite oxide for use as a positive-electrode active material for nonaqueous-electrolyte secondary batteries and an impact thereof on positive-electrode resistance of a battery, and they then found that the mixing of a lithium metal composite oxide powder and lithium tungstate allows positive-electrode resistance of a battery to be reduced, thereby improving output characteristics, and they accomplished the present invention.

Specifically, a first aspect of the present invention is to provide a method for manufacturing a positive-electrode material for nonaqueous-electrolyte secondary batteries, wherein a lithium metal composite oxide powder represented by a general formula $Li_zNi_{1-x-y}Co_xM_yO_2$ (wherein $0.10 \leq x \leq 0.35$, $0 \leq y \leq 0.35$, $0.97 \leq z \leq 1.20$, and M is an addition element and at least one element selected from Mn, V, Mg, Mo, Nb, Ti, and Al) and including primary particles and secondary particles composed of aggregation of the primary particles is mixed with lithium tungstate.

A second aspect of the present invention is to provide a method for manufacturing a positive-electrode material for nonaqueous-electrolyte secondary batteries, the method including a process of water-washing the lithium metal composite oxide powder prior to the mixing process of the lithium metal composite oxide with the lithium tungstate according to the first aspect.

A third aspect of the present invention is to provide a method for manufacturing a positive-electrode material for nonaqueous-electrolyte secondary batteries, wherein the amount of tungsten contained in the positive-electrode material for nonaqueous-electrolyte secondary batteries according to the first and second aspects is 0.1 to 3.0 atom % with respect to a total number of atoms of nickel, cobalt, and M, which are contained in the lithium metal composite oxide powder.

A fourth aspect of the present invention is to provide a method for manufacturing a positive-electrode material for nonaqueous-electrolyte secondary batteries, wherein the lithium tungstate according to the first and second aspects is at least any one selected from $Li_2WO_4$, $Li_4WO_5$, and $Li_6W_2O_9$.

A fifth aspect of the present invention is to provide a positive-electrode material for nonaqueous-electrolyte secondary batteries, wherein the positive-electrode material for nonaqueous-electrolyte secondary batteries comprises a mixture of a lithium metal composite oxide powder and lithium tungstate, the lithium metal composite oxide powder being represented by a general formula $Li_zNi_{1-x-y}Co_xM_yO_2$ (wherein $0.10 \leq x \leq 0.35$, $0 \leq y \leq 0.35$, $0.97 \leq z \leq 1.20$, and M is an addition element and at least one element selected from Mn, V, Mg, Mo, Nb, Ti, and Al) and including primary particles and secondary particles composed of aggregation of the primary particles.

A sixth aspect of the present invention is to provide a positive-electrode material for nonaqueous-electrolyte secondary batteries, wherein the amount of tungsten contained in the positive-electrode material for nonaqueous-electrolyte secondary batteries according to the fifth aspect is 0.1 to 3.0 atom % with respect to a total number of atoms of nickel, cobalt, and M, which are contained in the lithium metal composite oxide powder.

A seventh aspect of the present invention is to provide a positive-electrode material for nonaqueous-electrolyte secondary batteries, wherein the lithium tungstate according to the fifth and sixth aspects is at least any one selected from $Li_2WO_4$, $Li_4WO_5$, and $Li_6W_2O_9$, and furthermore, $Li_4WO_5$ is preferably included.

An eighth aspect of the present invention is to provide a nonaqueous-electrolyte secondary battery, wherein the nonaqueous-electrolyte secondary battery has a positive-electrode including the positive-electrode active material according to the fifth to seventh aspects of the present invention.

The present invention makes it possible to obtain a positive-electrode active material for nonaqueous-electrolyte secondary batteries, the positive-electrode active material achieving high output and high capacity when used as a positive-electrode material for batteries. Furthermore, a manufacturing method thereof according to the present invention is easy and suitable for manufacturing on an industrial scale, and accordingly has a great industrial value.

DETAILED DESCRIPTION

Hereinafter, the present invention will be explained in detail. A positive-electrode active material of the present invention will be explained first, and then, a manufacturing method therefor and a nonaqueous-electrolyte secondary battery using said positive-electrode active material will be explained.

(1) Positive Electrode Active Material

A positive-electrode material for nonaqueous-electrolyte secondary batteries according to the present invention comprises a mixture of a lithium metal composite oxide powder and lithium tungstate, the lithium metal composite oxide powder being represented by a general formula LizNi1−x−yCoxMyO2 (wherein $0.10 \leq x \leq 0.35$, $0 \leq y \leq 0.35$, $0.97 \leq z \leq 1.20$, and M is an addition element and at least one element selected from Mn, V, Mg, Mo, Nb, Ti, and Al) and including primary particles and secondary particles composed of aggregation of the primary particles.

The present invention uses the lithium metal composite oxide powder represented by the above-mentioned general formula as a positive-electrode active material to be used as a base material, whereby high charge-and-discharge capacity is achieved. Furthermore, the mixing of the lithium metal composite oxide powder and lithium tungstate allows output characteristics to be improved while allows the charge-and-discharge capacity to be maintained.

Usually, when a surface of a positive-electrode active material is completely coated with a different kind of compound, the movement of lithium ions (intercalation) is greatly limited, and, as a result, an advantage of high capacity which lithium composite oxide has is canceled. Furthermore, solid-dissolution of a different kind of element in lithium composite oxide tends to cause a decrease in capacity.

On the other hand, a compound having high lithium-ion conductivity has an effect to promote the movement of lithium ions, and therefore, the coating of the surface of the positive-electrode active material with such compound allows the intercalation in the surface of the positive-electrode active material to be promoted. However, in order to coat the surface of the positive-electrode active material, an after treatment, such as heat treatment, is required, and thus there is a possibility to cause deterioration of excellent battery characteristics which the positive-electrode active material has.

Lithium tungstate is also a compound having high lithium-ion conductivity, but, in the case of lithium tungstate, only the mixing of lithium tungstate with lithium metal composite oxide to make the lithium tungstate dispersed between lithium metal composite oxide particles can promote movement of lithium ions, thereby considerably reducing positive-electrode resistance. The lithium tungstate uniformly present in a positive-electrode material acts on an electrolyte solution or a positive-electrode active material, thereby causing a conduction path of lithium to be formed at an interface between the electrolyte solution and the positive-electrode active material, whereby reaction resistance of the active material is reduced to improve output characteristics.

In the case where lithium tungstate is non-uniformly dispersed in a positive-electrode material, movement of lithium ions between lithium metal composite oxide particles is uneven, and therefore, load is applied to specific lithium metal composite oxide particles, whereby deterioration in cycle characteristics and increase in reaction resistance are easily caused. Hence, it is preferable that lithium tungstate is uniformly dispersed in a positive-electrode material.

Thus, the lithium tungstate needs to be uniformly dispersed in a positive-electrode material, and preferably has an average particle diameter of 0.1 to 10 μm, more preferably 0.1 to 5 μm. In the case where the lithium tungstate has an average particle diameter of less than 0.1 μm, the fine particles of lithium tungstate which have insufficient lithium-ion conductivity are contained, and the above-mentioned effects cannot be obtained in a portion where a lot of such fine particles are present, and thus, as is the case with the non-uniform dispersion of the lithium tungstate, deterioration in cycle characteristics and increase in reaction resistance are eventually sometimes caused.

Also, in the case where the lithium tungstate has an average particle diameter of more than 10 μm, lithium tungstate cannot be uniformly dispersed in a positive-electrode material, and thus a sufficient reduction effect of reaction resistance cannot be sometimes obtained. The average particle diameter can be measured using a volume integral average in a laser diffraction scattering method.

It should be noted that, in the case where a particle diameter exceeds the above-mentioned range, the particles are preferably pulverized before the mixing.

The amount of tungsten contained in the positive-electrode material is preferably 0.1 to 3.0 atom % with respect to a total number of atoms of nickel, cobalt, and M, which are contained in the lithium metal composite oxide to be mixed. Thus, both high charge-and-discharge capacity and high output characteristics can be achieved. In the case where the amount of tungsten is less than 0.1 atom %, a sufficient improving effect on output characteristics is not sometimes achieved, on the other hand, in the case where the amount of tungsten is more than 3.0 atom %, too much amount of lithium tungstate sometimes inhibits lithium conduction between the lithium metal composite oxide and the electrolyte solution, thereby causing a decrease in charge-and-discharge capacity.

The lithium tungstate is at least any one selected from $Li_2WO_4$, $Li_4WO_5$, and $Li_6W_2O_9$, and furthermore, $Li_4WO_5$ is preferably included. In the lithium tungstate, not less than 50 mol % of $Li_4WO_5$ is particularly preferably contained. These lithium tungstate have high lithium-ion conductivity, and therefore the mixing thereof with the lithium metal composite oxide powder allows the above-mentioned effects to be sufficiently obtained.

The amount of lithium in the lithium metal composite oxide is preferably such that a ratio (Li/Me) of the number of atoms of lithium (Li) to the total number (Me) of atoms of nickel, cobalt, and M in the lithium metal composite oxide is 0.97 to 1.20.

When the Li/Me ratio is less than 0.97, reaction resistance of a positive-electrode in a nonaqueous-electrolyte secondary battery using the above-mentioned positive-electrode material increases, and this leads to a decrease of a battery output. On the other hand, when the Li/Me ratio is more than 1.20, discharge capacity of the positive-electrode active material decreases and also reaction resistance of a positive-electrode increases. In order to obtain higher discharge capacity, the Li/Me ratio is preferably not more than 1.10.

Co and the additive element M are added in order to improve battery characteristics, such as cycle characteristics and output characteristics, and when each of x and y, which represent the addition amount of Co and the additive element M, respectively, is more than 0.35, Ni, which contributes to a Redox reaction, is decreased, and accordingly a battery capacity is reduced.

On the other hand, when x, representing the addition amount of Co, is less than 0.10, sufficient cycle characteristics and sufficient thermal stability cannot be obtained. In order to obtain sufficient battery capacity when the positive-electrode material is used for a battery, y, representing the addition amount of M, is preferably not more than 0.15.

Furthermore, since an increase in a contact area with an electrolyte solution is advantageous in improvement of output characteristics, preferably used are lithium metal composite oxide particles which comprise primary particles and secondary particles composed of aggregation of the primary particles.

The positive-electrode material of the present invention has output characteristics improved by the mixing of the lithium metal composite oxide powder and the lithium tungstate, and there is no problem as long as powder characteristics of the lithium metal composite oxide powder, such as particle diameter and tap density, as a positive-electrode active material are within a range of a positive-electrode active material which is usually used. Furthermore, lithium metal composite oxide obtained by a well-known method is beneficial and lithium metal composite oxide having the above-mentioned composition and powder characteristics may be used.

Effects obtained by the mixing of the lithium metal composite oxide powder with the lithium tungstate can be brought not only to the positive-electrode active material according to the present invention, but also to a positive-electrode active material for lithium secondary batteries which is commonly used, such as lithium-cobalt composite oxide, lithium-manganese composite oxide, or lithium-nickel-cobalt-manganese composite oxide.

In the method for manufacturing a positive-electrode material for nonaqueous-electrolyte secondary batteries according to the present invention, a lithium metal composite oxide powder is mixed with lithium tungstate, the lithium metal composite oxide powder being a positive-electrode active material as a base material, represented by a general formula $Li_zNi_{1-x-y}Co_xM_yO_2$ (wherein $0.10 \leq x \leq 0.35$, $0 \leq y \leq 0.35$, $0.97 \leq z \leq 1.10$, and M is at least one element selected from Mn, V, Mg, Mo, Nb, Ti, and Al), and comprising primary particles and secondary particles composed of aggregation of the primary particles.

The lithium metal composite oxide powder and lithium tungstate are mixed sufficiently so as to uniformly disperse the lithium tungstate in the positive-electrode material.

In the mixing, an ordinary mixer may be used, and, for example, by the use of a shaker mixer, a Lodige mixer, a Julia mixer, a V blender, or the like, the lithium metal composite oxide powder is sufficiently mixed with the lithium tungstate so that a form of the lithium metal composite oxide particles is not broken. This allows the lithium tungstate to be uniformly dispersed in the lithium metal composite oxide powder.

Furthermore, in the manufacturing method according to the present invention, in order to improve battery capacity and safety of the positive-electrode material, the lithium metal composite oxide powder may be water-washed prior to the above-mentioned mixing process.

The water-washing may be performed by a well-known method and under a well-known condition, and may be performed so as to avoid deterioration of battery characteristics due to excessive elution of lithium from the lithium metal composite oxide powder.

In the case where the water-washing is performed, either method may be used, a method of mixing the lithium metal composite oxide powder with the lithium tungstate after drying, or a method of mixing the lithium metal composite oxide powder with the lithium tungstate after only solid-liquid separation and without drying. The drying may be performed by a well-known method and under a well-known condition, and may be performed so as to avoid deterioration of battery characteristics.

(2) Nonaqueous-Electrolyte Secondary Battery

A nonaqueous-electrolyte secondary battery according to the present invention comprises a positive electrode, a negative electrode, and a nonaqueous electrolyte solution, and is constituted by the same components as in an ordinary nonaqueous-electrolyte secondary battery. It should be noted that embodiments described below are only examples, and, based on the embodiments shown herein, the nonaqueous-electrolyte secondary battery according to the present invention can be realized in a form in which various changes and improvements are made based on the knowledge of a person skilled in the art. Furthermore, the use of the nonaqueous-electrolyte secondary battery according to the present invention is not particularly limited.

(a) Positive Electrode

Using the positive-electrode material for nonaqueous-electrolyte secondary batteries according to the present invention, a positive electrode of a nonaqueous-electrolyte secondary battery is produced, for example, as follows.

First, a positive-electrode material in powder form, an electric conductive material, and a binding agent are mixed, and furthermore, activated carbon and a solvent for a purpose such as viscosity adjustment are added as needed, and these are kneaded to produce a positive-electrode mixture paste.

Here, a mixing ratio of each component in the positive-electrode mixture paste is also an important factor to determine performance of a nonaqueous-electrolyte secondary battery. Therefore, it is preferable that, as is the case with a positive-electrode of an ordinary nonaqueous-electrolyte secondary battery, when a total mass of the solid content in the positive-electrode mixture except a solvent is taken as 100 parts by mass, the content of the positive-electrode active material is 60 to 95 parts by mass, the content of the electrically conductive material is 1 to 20 parts by mass, and the content of the binding agent is 1 to 20 parts by mass.

The obtained positive-electrode mixture paste is, for example, applied to a surface of a current collector made of aluminum foil, and dried to scatter the solvent. As needed, pressurization is performed by a roll press or the like in order to increase electrode density.

Thus, a sheet-like positive electrode can be produced.

The sheet-like positive electrode thus produced may be, for example, cut into a suitable size in accordance with an objective battery, and used for production of a battery. It should be noted that the manufacturing method of a positive electrode is not limited to the above-mentioned example and may be another method.

In the production of the positive electrode, as an electrically conductive agent, for example, graphite (natural graphite, artificial graphite, expanded graphite, or the like), or a carbon black material, such as acetylene black or Ketchen black, is usable.

The binding agent plays a role which ties active material particles, and for example, polyvinylidene fluoride (PVDF), polytetrafluoroethylene (PTFE), fluororubber, ethylene propylene diene rubber, styrene butadiene, cellulose resin, polyacrylic acid, or the like is usable.

As needed, a solvent which disperses the positive-electrode active material, the electrically conductive material, and activated carbon and dissolves the binding agent is added to the positive-electrode mixture. As the solvent, specifically, an organic solvent such as N-methyl-2-pyrrolidone is usable. Furthermore, activated carbon may be added to the positive-electrode mixture in order to increase electrical double-layer capacity.

(b) Negative Electrode

For a negative electrode, there is used a material obtained in such a manner that a binding agent is mixed with metallic lithium, a lithium alloy, or the like, or a negative electrode active material capable of inclusion and desorption of lithium ions; and a suitable solvent is added thereto to make a negative electrode mixture having a paste form; and the negative electrode mixture is applied to a surface of a metallic foil current collector such as copper and dried, and then compressed and formed as needed in order to increase electrode density.

As the negative electrode active material, for example, natural graphite, artificial graphite, an organic compound baked material such as phenol resin, or powder of a carbon substance such as coke is usable. In this case, as the negative electrode binding agent, a fluorine-containing resin such as PVDF is usable as is the case with the positive electrode. As a solvent which disperses the active material and the binding agent, an organic solvent such as N-methyl-2-pyrrolidone is usable.

(c) Separator

A separator is arranged so as to be sandwiched between the positive electrode and the negative electrode.

The separator serves to separate the positive electrode and the negative electrode and to maintain an electrolyte, and for the separator, a thin film made of polyethylene, polypropylene, or the like and having many minute pores may be used.

(d) Nonaqueous Electrolyte Solution

A nonaqueous electrolyte solution is obtained by dissolving a lithium salt as a supporting electrolyte in an organic solvent.

As the organic solvent, there may be used one kind alone or two or more kinds mixed, selected from the group consisting of a cyclic carbonate, such as ethylene carbonate, propylene carbonate, butylene carbonate, or trifluoro propylene carbonate; a chain carbonate, such as diethyl carbonate, dimethyl carbonate, ethylmethyl carbonate, or dipropyl carbonate; an ether compound, such as tetrahydrofuran, 2-methyltetrahydrofuran, or dimethoxyethane; a sulfur compound, such as ethylmethylsulfone, or butanesultone; a phosphorus compound, such as triethyl phosphate, or trioctyl phosphate; and the like.

As the supporting electrolyte, $LiPF_6$, $LiBF_4$, $LiClO_4$, $LiAsF_6$, $LiN(CF_3SO_2)_2$ or the like, or a composite salt thereof may be used.

Furthermore, the nonaqueous-electrolyte solution may contain a radical scavenger, a surface active agent, a flame retardant, and the like.

(e) Shape and Configuration of Nonaqueous-Electrolyte Secondary Battery

As a shape of the nonaqueous-electrolyte secondary battery constituted by the positive electrode, the negative electrode, the separator, and the nonaqueous electrolyte solution according to the present invention as mentioned above, various shapes, such as a cylinder type and a laminated type, may be applied.

Even when any of the shapes is adopted, the nonaqueous-electrolyte secondary battery is completed in such a manner that the positive electrode and the negative electrode are laminated via the separator to form an electrode body; the obtained electrode body is impregnated with the nonaqueous electrolyte solution; connection between a positive electrode current collector and a positive electrode terminal connected with an exterior and connection between a negative electrode current collector and a negative electrode terminal connected with an exterior are established using such as a lead for current collecting; and sealing in a battery case is performed.

(f) Characteristics

A nonaqueous-electrolyte secondary battery using the positive-electrode active material according to the present invention has high capacity and high output.

In particular, a nonaqueous-electrolyte secondary battery using the positive-electrode active material obtained in the more preferable embodiment has still higher capacity and still higher output, for example, when the positive-electrode active material is used in a positive electrode of a 2032 type coin battery, a high initial discharge capacity of not less than 165 mAh/g and a low positive-electrode resistance are obtained. Furthermore, the nonaqueous-electrolyte secondary battery has high thermal stability and also is excellent in safety.

A measuring method of the positive-electrode resistance according to the present invention is exemplified as follows.

Figure 1:
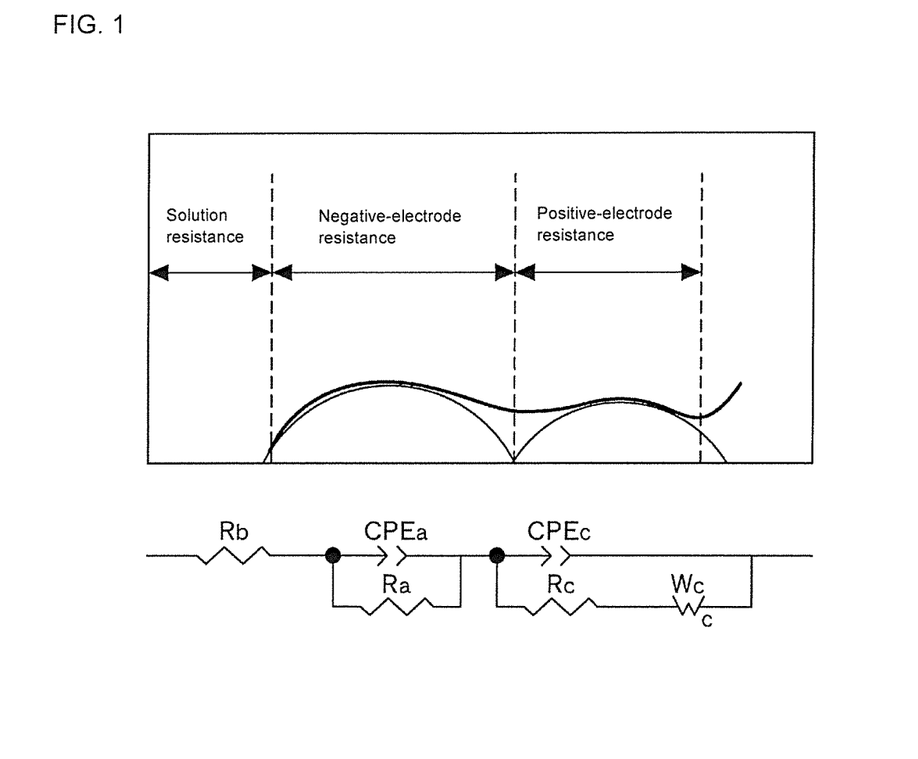
FIG. 1 is a schematic explanatory diagram showing a measurement example of impedance evaluation and an equivalent circuit used for analysis.

When frequency dependency of battery reaction is measured using an alternating current impedance method, which is common as an electrochemical evaluation method, a Nyquist diagram based on solution resistance, negative-electrode resistance and negative-electrode capacity, and positive-electrode resistance and positive-electrode capacity is obtained as shown in FIG. 1.

The battery reaction in the electrode comprises a resistance component associated with charge transfer, and a capacity component of an electric double layer, and, when these components are represented using an electric circuit, the electric circuit is a parallel circuit of resistance and capacity, and the whole of a battery is represented by an equivalent circuit in which solution resistance, a parallel circuit of a negative electrode, and a parallel circuit of a positive-electrode are connected in series.

A fitting calculation is performed for the Nyquist diagram measured using this equivalent circuit, whereby each of resistance components and capacity components can be estimated.

The positive-electrode resistance is equal to a diameter of a semicircle at a side of a lower frequency in the obtained Nyquist diagram.

Thus, alternating current impedance measurement is performed for a positive electrode produced, and, for the obtained Nyquist diagram, a fitting calculation is performed using an equivalent circuit, whereby positive-electrode resistance can be estimated.

EXAMPLES

For a nonaqueous-electrolyte secondary battery having a positive electrode including the positive-electrode material obtained according to the present invention, its characteristics (initial discharge capacity, positive-electrode resistance) were confirmed.

Hereinafter, the present invention will be specifically explained using the following Examples, but the present invention is not limited at all by these Examples.

(Manufacturing and Evaluation of Battery)

For evaluation of a positive-electrode material, a 2032 type coin battery shown in FIG. 2 (hereinafter, referred to as a coin type battery 1) was used.

Figure 2:
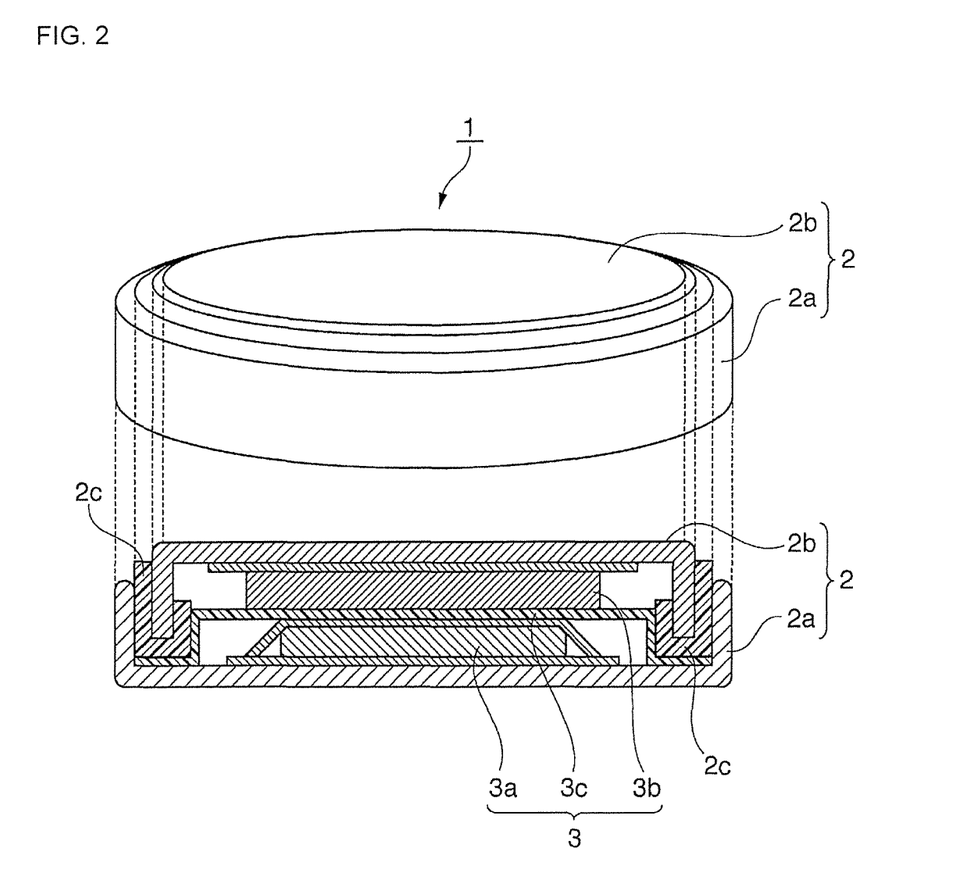
FIG. 2 shows a schematic sectional view of a coin-type battery 1 used for battery evaluation.

As shown in FIG. 2, the coin type battery 1 is constituted by a case 2 and an electrode 3 housed in the case 2.

The case 2 has a positive electrode can 2a having a hollow and an opening portion at one end, and a negative electrode can 2b arranged in the opening portion of the positive electrode can 2a; and is configured such that, when the negative electrode can 2b is arranged in the opening portion of the positive electrode can 2a, a space to house the electrode 3 between the negative electrode can 2b and the positive electrode can 2a is formed.

The electrode 3 comprises a positive electrode 3a, a separator 3c, and a negative electrode 3b, which are laminated so as to be arranged in a line in this order, and is housed in the case 2 so that the positive electrode 3a comes into contact with an inside of the positive electrode can 2a, meanwhile the negative electrode 3b comes into contact with an inside of the negative electrode can 2b.

It should be noted that the case 2 is equipped with a gasket 2c, and the gasket 2c allows relative movement to be fixed so as to keep the positive electrode can 2a and negative electrode can 2b in a non-contact state. The gasket 2c also has a function to seal a gap between the positive electrode can 2a and the negative electrode can 2b to air-tightly and fluid-tightly interrupt between an interior and an exterior of the case 2.

The coin type battery 1 used herein was manufactured as follows.

First, 52.5 mg of a positive-electrode material for non-aqueous-electrolyte secondary batteries, 15 mg of acetylene black, and 7.5 mg of polytetrafluoroethylene resin (PTFE) were mixed, and press-formed at a pressure of 100 MPa to be 11 mm in diameter and 100 µm in thickness, whereby the positive electrode 3a was produced. Then, the obtained positive electrode 3a was dried in a vacuum dryer at 120 degrees C. for 12 hours.

Using the dried positive electrode 3a, the negative electrode 3b, the separator 3c, and an electrolyte solution, the coin type battery 1 illustrated in FIG. 2 was produced in a glove box with an Ar atmosphere in which a dew point was controlled at −80 degrees C.

For the negative electrode 3b, there was used a negative electrode sheet which was punched into the shape of a disk having a diameter of 14 mm and in which graphite powder having an average particle diameter of approximately 20 µm and polyvinylidene fluoride were applied to a copper foil.

For the separator 3c, there was used a porous polyethylene film having a film thickness of 25 µm.

For the electrolyte solution, there was used an equal volume liquid mixture (manufactured by Tomiyama Pure Chemical Industries, Limited) of ethylene carbonate (EC) and diethyl carbonate (DEC), wherein 1 M of $LiClO_4$ was used as a supporting electrolyte.

Initial discharge capacity and positive-electrode resistance, which show the characteristics of the manufactured coin type battery 1, were evaluated using the following method.

Initial discharge capacity was evaluated in such a manner that the coin type battery 1 was left to stand for 24 hours after manufacturing thereof; after an open circuit voltage (OCV) was stabilized, with a current density for a positive electrode being set to 0.1 $mA/cm^2$, charging was performed to 4.3 V of cut-off voltage; and then, after a 1-hour suspension, discharging was performed to 3.0 V of cut-off voltage, and a capacity at the time of this discharging was regarded as initial discharge capacity.

As for positive-electrode resistance, the coin type battery 1 was charged to a charging electric potential of 4.1 V, and, a measurement was performed using a frequency response analyzer and a potentiogalvanostat (manufactured by Solartron, 1255B), by an alternating-current-impedance method, whereby a Nyquist plot shown in FIG. 1 was obtained. The obtained Nyquist plot was expressed as the sum of characteristic curves showing a solution resistance, a negative-electrode resistance and a capacity thereof, and a positive-electrode resistance and a capacity thereof, and therefore, based on this Nyquist plot, a fitting calculation was performed using an equivalent circuit to calculate a value of the positive-electrode resistance.

It should be noted that, in the Examples, for manufacturing a composite hydroxide and producing a positive-electrode active material and a secondary battery, each sample of extra-pure reagents manufactured by Wako Pure Chemical Industries, Ltd. was used.

Example 1

As a base material of a positive-electrode material, there was used a lithium metal composite oxide powder represented as $Li1.060Ni0.76Co0.14Al0.1002$ and obtained by a well-known technique in which oxide containing nickel as a main component and lithium hydroxide were mixed and baked. This lithium metal composite oxide powder had an average particle diameter of 5.0 µm, and a specific surface area of 0.9 m2/g. It should be noted that the composition was analyzed by ICP method, the average particle diameter was evaluated using a volume integral average in a laser diffraction scattering method, and the specific surface area was evaluated using BET method by nitrogen gas adsorption.

Added was 0.19 g of lithium tungstate ($Li_2WO_4$) powder to 15 g of the obtained lithium metal composite oxide powder, and then sufficiently mixed using a shaker mixer (TURBULA Type T2C, manufactured by Willy A. Bachofen (WAB)) to obtain a mixture of the lithium tungstate and the lithium metal composite oxide powder as a positive-electrode material.

When the amount of tungsten contained in the positive-electrode material was analyzed by ICP method, it was confirmed that the positive-electrode material had a composition of 0.50 atom % of tungsten with respect to a total number of atoms of nickel, cobalt, and M. Thus, it was also confirmed that a compounding ratio of the mixture of the lithium tungstate and the lithium metal composite oxide powder was equivalent to the composition of the positive-electrode material.

(Battery Evaluation)

There were evaluated the battery characteristics of a coin type battery 1 having a positive-electrode produced using the obtained positive-electrode active material. For evaluation of positive-electrode resistance, a relative value obtained by taking Example 1 as 100 was regarded as an evaluation value.

The initial discharge capacity of Example 1 was 182.7 mAh/g, while discharge capacity thereof after 500 cycles was 170.6 mAh/g.

Hereinafter, in Examples 2 to 7 and Comparative Example 1, only a material and a condition which were changed from Example 1 will be described. Table 1 shows the initial discharge capacity and evaluation values of positive-electrode resistance of Examples 1 to 7 and Comparative Example 1.

Example 2

A coin type battery was produced using a positive-electrode material for nonaqueous-electrolyte secondary batteries and battery characteristics thereof were evaluated, the positive-electrode material being produced in the same manner as in Example 1, except that 0.57 g of lithium tungstate was used.

Example 3

A coin type battery was produced using a positive-electrode material for nonaqueous-electrolyte secondary batteries and battery characteristics thereof were evaluated, the positive-electrode material being produced in the same manner as in Example 1, except that, as a base material of the positive-electrode material, there was used a lithium metal composite oxide powder having a composition represented by $Li1.060Ni0.82Co0.15Al0.03O2$ and having an average particle diameter of 13.2 μm and a specific surface area of 0.7 m2/g.

Example 4

A coin type battery was produced using a positive-electrode material for nonaqueous-electrolyte secondary batteries and battery characteristics thereof were evaluated, the positive-electrode material being produced in the same manner as in Example 1, except that, as a base material of the positive-electrode material, there was used a lithium metal composite oxide powder having a composition represented by $Li1.150Ni0.34Co0.33Mn0.33O2$ and having an average particle diameter of 4.1 μm and a specific surface area of 1.0 m2/g.

Example 5

A coin type battery was produced using a positive-electrode material for nonaqueous-electrolyte secondary batteries and battery characteristics thereof were evaluated, the positive-electrode material being produced in the same manner as in Example 1, except that, before mixed with lithium tungstate, a lithium metal composite oxide powder as a base material was water-washed under a condition of 1.5 g/ml.

Example 6

A coin type battery was produced using a positive-electrode material for nonaqueous-electrolyte secondary batteries and battery characteristics thereof were evaluated, the positive-electrode material being produced in the same manner as in Example 1, except that, lithium tungstate containing $Li4WO5$ as a main component (not less than 50 mol % content) was used.

Example 7

A coin type battery was produced using a positive-electrode material for nonaqueous-electrolyte secondary batteries and battery characteristics thereof were evaluated, the positive-electrode material being produced in the same manner as in Example 1, except that, 1.33 g of lithium tungstate was used.

Comparative Example 1

A coin type battery was produced using a lithium metal composite oxide powder used as a base material in Example as a positive-electrode active material (positive-electrode material), and battery characteristics thereof were evaluated.

TABLE 1

| | Addition Amount of W [atom %] | Initial Discharge Capacity [mAh/g] | Positive-Electrode Resistance |
|---|---|---|---|
| Example 1 | 0.50 | 182.7 | 100 |
| Example 2 | 1.50 | 176.0 | 89 |
| Example 3 | 0.50 | 190.2 | 120 |
| Example 4 | 0.50 | 175.2 | 92 |
| Example 5 | 0.50 | 188.6 | 125 |
| Example 6 | 0.50 | 182.9 | 90 |
| Example 7 | 3.50 | 165.5 | 145 |
| Comparative Example 1 | — | 185.6 | 199 |

(Evaluation)

It was confirmed that, since the positive-electrode materials of Examples 1 to 7 were manufactured in accordance with the present invention, nonaqueous-electrolyte secondary batteries using these positive-electrode materials have higher initial discharge capacity and lower positive-electrode resistance, and hence the batteries had excellent characteristics. Particularly, Examples 1 to 6, which were implemented under a preferable condition of an addition amount of lithium tungstate, show further more excellent initial discharge capacity and positive-electrode resistance, and thus are more suitable as a positive-electrode material for nonaqueous-electrolyte secondary batteries. Particularly, Example 6 is excellent in both initial discharge capacity and positive-electrode resistance.

In Example 7, a large amount of lithium tungstate was added, thereby inhibiting lithium conduction between the lithium metal composite oxide in the positive-electrode material and the electrolyte solution, and as a result, the initial discharge capacity and the positive-electrode resistance were somewhat poorer, compared to those of Examples 1 to 6.

In Comparative Example 1, lithium tungstate was not mixed in, and therefore positive-electrode resistance is significantly high, hence it is difficult to respond to a demand for high output.

From the results mentioned above, it can be confirmed that a nonaqueous-electrolyte secondary battery using the positive-electrode material according to the present invention has higher initial discharge capacity and lower positive-electrode resistance, and thus is a battery having excellent characteristics.

INDUSTRIAL APPLICABILITY

The nonaqueous-electrolyte secondary battery according to the present invention is suitable for power sources of small portable electronic equipment (such as notebook-sized personal computers and cell phones) in which high capacity is always required, and also suitable for batteries for electric vehicles in which high output is required.

Furthermore, the nonaqueous-electrolyte secondary battery according to the present invention is excellent in safety, and capable of achieving miniaturization and high output, and therefore suitable for a power source for electric vehicles which is subject to a restriction on a loading space.

It should be noted that the present invention may be applied not only to a power source for electric vehicles driven purely with electric energy, but also to a power source for what is called hybrid cars in which a combustion engine, such as a gasoline engine or a diesel engine, is used in combination.

REFERENCE SIGNS LIST

1 . . . coin type battery
2 . . . case
2a . . . positive electrode can
2b . . . negative electrode can
2c . . . gasket
3 . . . electrode
3a . . . positive electrode
3b . . . negative electrode
3c . . . separator

What is claimed is:

1. A method for manufacturing a positive-electrode material for nonaqueous-electrolyte secondary batteries, the method comprising:

mixing a baked lithium metal composite oxide powder with a lithium tungstate powder so that the lithium tungstate powder is dispersed between particles of the lithium metal composite oxide powder, wherein the lithium metal composite oxide powder being represented by a general formula $Li_zNi_{1-x-y}Co_xM_yO_2$; wherein $0.10 \leq x \leq 0.35$, $0 \leq y \leq 0.35$, $0.97 \leq z \leq 1.20$, and M is an addition element and at least one element selected from Mn, V, Mg, Mo, Nb, Ti, and Al, and the lithium metal composite oxide powder comprising primary particles and secondary particles composed of aggregation of the primary particles; and then without baking the mixture of the lithium metal composite oxide powder and the lithium tungstate powder to obtain the positive-electrode material wherein the lithium tungstate includes $Li_4WO_5$.

2. The method of claim 1, wherein the lithium metal composite oxide powder was water-washed prior to mixing with the lithium tungstate.

3. The method of claim 2, wherein an amount of tungsten contained in the positive-electrode material is 0.1 to 3.0 atom % with respect to a total number of atoms of nickel, cobalt, and M, that are contained in the lithium metal composite oxide powder.

4. The method of claim 1, wherein the lithium tungstate further includes at least one of $Li_2WO_4$ and $Li_6W_2O_9$.

5. A method for manufacturing a positive-electrode for a nonaqueous-electrolyte secondary batteries, the method comprising:

mixing a baked lithium metal composite oxide powder with a lithium tungstate powder so that the lithium tungstate powder is dispersed between particles of the lithium metal composite oxide powder, wherein the lithium metal composite oxide powder being represented by a general formula $Li_zNi_{1-x-y}Co_xM_yO_2$ (wherein $0.10 \leq x \leq 0.35$, $0 \leq y \leq 0.35$, $0.97 \leq z \leq 1.20$, and M is an addition element and at least one element selected from Mn, V, Mg, Mo, Nb, Ti, and Al, and the lithium metal composite oxide powder comprising primary particles and secondary particles composed of aggregation of the primary particles; and then without baking the mixture of the lithium metal composite oxide powder and the lithium tungstate powder admixing the mixture of the lithium metal composite oxide powder and the lithium tungstate powder with an electrically conductive agent and a binding agent; and then forming the positive-electrode from the admixture of the lithium metal composite oxide powder, the lithium tungstate powder, the electrically conductive agent, and the binding agent, with no baking.

6. The method of claim 5, further comprising press-forming the positive-electrode from the admixture of the lithium metal composite oxide powder, the lithium tungstate powder, the electrically conductive agent, and the binding agent.

7. The method of claim 5, wherein the lithium metal composite oxide powder was water-washed prior to mixing with the lithium tungstate.

8. The method of claim 7, wherein an amount of tungsten contained in the positive-electrode material is 0.1 to 3.0 atom % with respect to a total number of atoms of nickel, cobalt, and M, that are contained in the lithium metal composite oxide powder.

9. The method of claim 5, wherein the lithium tungstate is selected from $Li_2WO_4$, $Li_4WO_5$, $Li_6W_2O_9$, and a mixture thereof.

10. The method of claim 9, wherein the lithium tungstate includes $Li_4WO_5$.

11. The method of claim 5, wherein the electrically conductive agent is selected from graphite, acethylene black, and Ketchen black.

12. The method of claim 5, wherein the binding agent is selected from polyvinylidene fluoride (PVDF), polytetrafluoroethylene (PTFE), fluororubber, ethylene propylene diene rubber, styrene butadiene, cellulose resin, and polyacrylic acid.

* * * * *